US012577755B2

(12) United States Patent (10) Patent No.: US 12,577,755 B2
Moriki et al. (45) Date of Patent: Mar. 17, 2026

(54) WORK MACHINE AND CONTROL SYSTEM

(71) Applicant: HITACHI CONSTRUCTION MACHINERY CO., LTD., Tokyo (JP)

(72) Inventors: Hidekazu Moriki, Tokyo (JP); Ryu Narikawa, Tokyo (JP); Shinya Imura, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 275 days.

(21) Appl. No.: 17/787,620

(22) PCT Filed: Nov. 20, 2020

(86) PCT No.: PCT/JP2020/043431
§ 371 (c)(1),
(2) Date: Jun. 21, 2022

(87) PCT Pub. No.: WO2021/166351
PCT Pub. Date: Aug. 26, 2021

(65) Prior Publication Data
US 2022/0412052 A1 Dec. 29, 2022

(30) Foreign Application Priority Data
Feb. 21, 2020 (JP) ................................. 2020-028362

(51) Int. Cl.
*E02F 9/20* (2006.01)
*B60Q 5/00* (2006.01)
(Continued)

(52) U.S. Cl.
CPC ............ *E02F 9/2033* (2013.01); *B60Q 5/006* (2013.01); *E02F 9/24* (2013.01); *E02F 9/262* (2013.01)

(58) Field of Classification Search
CPC ........... E02F 9/2033; E02F 9/24; E02F 9/262; E02F 9/268; E02F 9/20; E02F 9/26; B60Q 5/006; B60Y 2200/412
See application file for complete search history.

(56) References Cited

U.S. PATENT DOCUMENTS 5,735,065 A * 4/1998 Yamagata ............... E02F 3/437
701/50
2020/0115888 A1 4/2020 Nakamura et al.
(Continued)

FOREIGN PATENT DOCUMENTS

JP 2007-19733 A 1/2007
JP 2008-248653 A 10/2008
(Continued)

OTHER PUBLICATIONS

International Search of PCT/JP2020/043431 dated Feb. 9, 2021.
(Continued)

*Primary Examiner* — Anne Marie Antonucci
*Assistant Examiner* — Patrick M Brady
(74) *Attorney, Agent, or Firm* — MATTINGLY & MALUR, PC

(57) ABSTRACT

A hydraulic excavator for performing cooperative work with another hydraulic excavator or a worker includes: a driving device that makes the hydraulic excavator operate; a cooperative function device that shares information about the hydraulic excavator with an inside and an outside of the hydraulic excavator; and a controller that controls the driving device that makes the hydraulic excavator operate, the controller, when there is an abnormality in the cooperative function device, controlling the driving device so as to limit operation of the hydraulic excavator, and when the hydraulic excavator is performing the cooperative work, controlling the driving device so as to make a degree of limitation on the operation of the hydraulic excavator stronger than when the (Continued)

hydraulic excavator is not performing the cooperative work. It is thereby possible to suppress an unnecessary decrease in work efficiency by suppressing an excessive operation limitation on the hydraulic excavator.

5 Claims, 11 Drawing Sheets

(51) Int. Cl.
 E02F 9/24          (2006.01)
 E02F 9/26          (2006.01)

(56) References Cited

U.S. PATENT DOCUMENTS

2020/0174465 A1* 6/2020 Minagawa .............. E02F 9/267

| | | | | |
|---|---|---|---|---|
| 2021/0174660 | A1* | 6/2021 | Kamimura | G08B 5/36 |
| 2021/0262196 | A1* | 8/2021 | Ito | E02F 9/205 |

FOREIGN PATENT DOCUMENTS

| | | | |
|---|---|---|---|
| JP | 4490898 | B2 | 6/2010 |
| JP | 2019-56246 | A | 4/2019 |
| JP | 2019-65657 | A | 4/2019 |

OTHER PUBLICATIONS

International Preliminary Report on Patentability received in corresponding International Application No. PCT/JP2020/043431 dated Sep. 1, 2022.
Extended European Search Report received in corresponding European Application No. 20919412.5 dated Jan. 18, 2024.

* cited by examiner

FIG. 3

| CLASSIFICATION | ID | No. | x | y | z |
|---|---|---|---|---|---|
| WORK AREA | 1 | 1 | 10 | 20 | – |
|  | 1 | 2 | 50 | 20 | – |
|  | 1 | 3 | 50 | 50 | – |
|  | 1 | 4 | 10 | 50 | – |
|  | 1 | 0 | – | – | – |
| DESIGN SURFACE | 2 | 11 | 10 | 35 | 0 |
|  | 2 | 12 | 50 | 35 | 0 |
|  | 2 | 12 | 10 | 45 | 7 |
|  | 2 | 12 | 10 | 45 | 7 |
|  | 2 | 12 | 50 | 35 | 0 |
|  | 2 | 12 | 50 | 45 | 7 |
|  | 2 | 12 | 10 | 45 | 7 |
|  | 2 | 12 | 50 | 45 | 7 |
|  | 2 | 12 | 50 | 50 | 7 |
|  | 2 | 12 | 10 | 45 | 7 |
|  | 2 | 12 | 50 | 50 | 7 |
|  | 2 | 12 | 10 | 50 | 7 |
|  | 2 | 0 | – | – | – |

WORK MACHINE AND CONTROL SYSTEM

TECHNICAL FIELD

The present invention relates to a work machine and a control system.

BACKGROUND ART

As a technology for controlling a transportation vehicle in view of a communication fault on a work site on which a work machine and the transportation vehicle that are remotely operated are disposed, Patent Document 1, for example, discloses a work system including: a work machine that operates on the basis of an operation signal; an operation device that is provided on the outside of the work machine, and transmits the operation signal; a transportation vehicle that transports a load loaded by the work machine; and a controller that transmits a travelling suppressing instruction signal to the transportation vehicle when sensing a fault in communication between the operation device and the work machine.

PRIOR ART DOCUMENT

Patent Document

Patent Document 1: JP-2019-65657-A

SUMMARY OF THE INVENTION

Problems to be Solved by the Invention

In the above-described conventional technology, when a fault occurs in communication between the operation device and the work machine, the transportation vehicle is stopped or decelerated by transmitting a stop instruction signal or a deceleration signal as the travelling suppressing instruction signal, and thereby contact between the work machine and the transportation vehicle is prevented.

However, for example, when functions for performing work are normal in a case where an operator aboard the work machine performs an operation or in a case where autonomous work is performed, the fault in the communication may not become a problem in carrying out the work. That is, in such a case, the stopping or decelerating of the work machine in response to the fault in the communication is excessive control, and invites an unnecessary decrease in work efficiency.

The present invention has been made in view of the above. It is an object of the present invention to provide a work machine and a control system that can suppress an unnecessary decrease in work efficiency by suppressing an excessive operation limitation on the work machine.

Means for Solving the Problems

The present application includes a plurality of means for solving the above-described problems. To cite an example of the means, there is provided a work machine for performing cooperative work with another work machine or a worker, the work machine including: a driving device that makes the work machine operate; a cooperative function device that shares information about the work machine with an inside and an outside of the work machine; and a controller that controls the driving device that makes the work machine operate, the controller being configured to, when there is an abnormality in the cooperative function device, control the driving device so as to limit operation of the work machine, and when the work machine is performing the cooperative work, control the driving device so as to make a degree of limitation on the operation of the work machine stronger than when the work machine is not performing the cooperative work.

Advantages of the Invention

According to the present invention, it is possible to suppress an unnecessary decrease in work efficiency by suppressing an excessive operation limitation on the work machine.

BRIEF DESCRIPTION OF THE DRAWINGS

FIG. 3 is a diagram showing numerical data as an example of work information extracted by a communicating section.

MODE FOR CARRYING OUT THE INVENTION

Embodiments of the present invention will hereinafter be described with reference to the drawings. It is to be noted that while the present embodiments will be described by illustrating a hydraulic excavator as an example of a work machine, the present invention can be applied also to other work machines that perform cooperative work on a work site.

First Embodiment

A first embodiment of the present invention will be described with reference to FIGS. 1 to 9.

Figure 1:
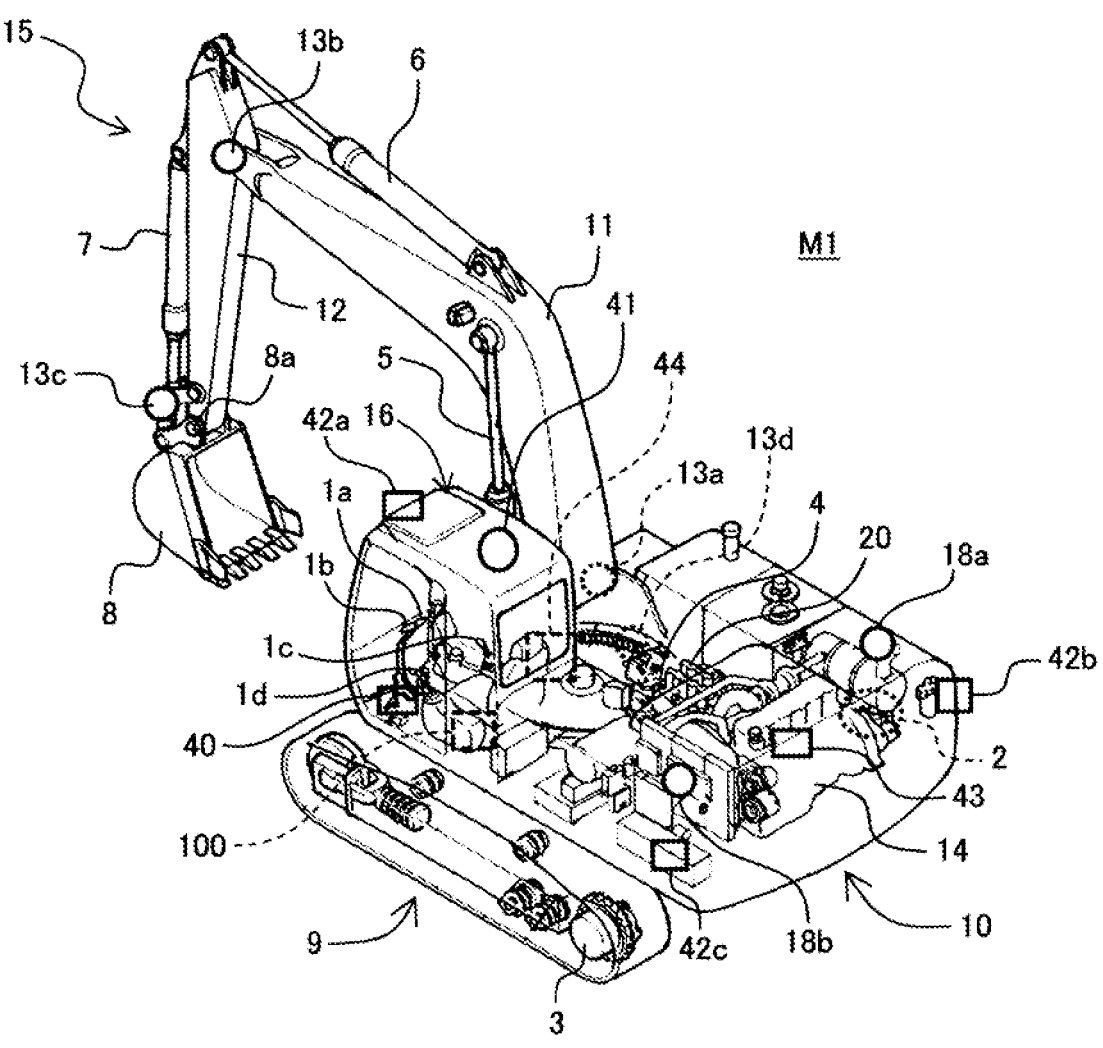
FIG. 1 is a diagram schematically showing an external appearance of a hydraulic excavator as an example of a work machine.

FIG. 1 is a diagram schematically showing an external appearance of a hydraulic excavator as an example of a work machine according to the present embodiment.

In FIG. 1, a hydraulic excavator M1 includes: an articulated front work implement 15 formed by coupling a plurality of driven members (a boom 11, an arm 12, and a bucket (work tool) 8) each rotated in a vertical direction to each other; and an upper swing structure 10 and a lower track structure 9 that constitute a machine body. The upper swing structure 10 is provided so as to be swingable with respect to the lower track structure 9. In addition, a proximal end of the boom 11 of the front work implement 15 is supported by a front portion of the upper swing structure 10 so as to be rotatable in the vertical direction. One end of the arm 12 is supported by an end portion (distal end) of the boom 11, which is different from the proximal end of the boom 11, so as to be rotatable in the vertical direction. The bucket 8 is supported by another end of the arm 12 so as to be rotatable in the vertical direction. The boom 11, the arm 12, the bucket 8, the upper swing structure 10, and the lower track structure 9 are respectively driven by a boom cylinder 5, an arm cylinder 6, a bucket cylinder 7, a swing hydraulic motor 4, and a left and a right travelling hydraulic motor 3 (only one travelling hydraulic motor is shown) as hydraulic actuators (driving devices).

A cab 16 boarded by an operator is provided with not only a monitor (not shown) on which various information is displayed but also operation levers 1c and 1d (operation devices) that output operation signals for operating the hydraulic actuators 3, 4, 5, 6, and 7, travelling operation levers 1a and 1b (operation devices) that output operation signals for operating the left and right travelling hydraulic motors 3, a communicating device 44 that transmits and receives information to and from the outside of the hydraulic excavator M1 (for example, a management server within a management office, or a controller) by wireless communication, an operation selector switch 40 that changes an operation state of the hydraulic excavator M1, a controller 100 that controls operation of the whole of the hydraulic excavator M1, and the like.

Though not shown, the operation levers 1c and 1d can each be tilted forward, rearward, leftward, and rightward. The operation levers 1c and 1d include sensors not shown which electrically detect tilting amounts of the levers, that is, lever operation amounts. The lever operation amounts sensed by the sensors are output as an operation signal to the controller 100 as a controller via electric wiring. That is, forward and rearward directions or left and right directions of the operation levers 1c and 1d are respectively assigned operations of the hydraulic actuators 3, 4, 5, 6, and 7.

The operation selector switch 40 is a switch that selectively changes the operation state of the hydraulic excavator M1 between a manual operation and an automatic operation according to an operation of the operator. When the manual operation is selected by the operation selector switch 40, the work machine operates according to operation of the operation devices (the operation levers 1c and 1d and the travelling operation levers 1a and 1b) by the operator. In addition, when the automatic operation is selected by the operation selector switch 40, the work machine automatically operates on the basis of information included in a communication signal received by the communicating device 44 (information such as work information, a work start instruction, a work mode, and the like).

A state notifying device 41 that notifies surroundings about the operation state of the hydraulic excavator M1 is disposed on an upper portion of the cab 16. The state notifying device 41 notifies the surroundings about the operation state by, for example, emitting light of a color corresponding to the operation state of the hydraulic excavator M1 or setting a light emission state corresponding to the operation state (illuminating, blinking, or the like).

In addition, the upper portion of the cab 16 and the left and right of a rear portion of the upper swing structure 10 are respectively provided with detecting sensors 42a, 42b, and 42c (surrounding detecting devices) that detect an object on the periphery of the hydraulic excavator M1. In addition, an upper portion of the upper swing structure 10 is provided with an alarm device 43 that issues an alarm to the surroundings of the hydraulic excavator M1 according to detection results of the detecting sensors 42a, 42b, and 42c under control of the controller 100. The detecting sensors 42a, 42b, and 42c are, for example, a LiDAR device (Light Detection and Ranging device) that senses the position of the object. Incidentally, it suffices for the detecting sensors 42a, 42b, and 42c to be able to detect the position of the object. A millimeter-wave radar, an infrared sensor, or a camera, for example, may be used as the detecting sensors 42a, 42b, and 42c. In addition, the alarm device 43 issues alarm notification that alerts the surroundings or prompts for evacuation from the detection range when the detecting sensors 42a, 42b, and 42c detect an object (for example, a worker) in the range (detection range) set in advance on the periphery of the hydraulic excavator M1.

Operation control on the boom cylinder 5, the arm cylinder 6, the bucket cylinder 7, the swing hydraulic motor 4, and the left and right travelling hydraulic motors 3 is performed by controlling, by a control valve 20, a direction and a flow rate of hydraulic operating fluid supplied from a hydraulic pump device 2 driven by a prime mover of an engine (or an electric motor or the like) to each of the hydraulic actuators 3, 4, 5, 6, and 7. Operation control on the control valve 20 is performed by driving, by a machine control signal (operation control signal) output from the controller 100, a solenoid proportional valve that controls a pilot pressure output to the control valve 20 from a pilot pump not shown which has a solenoid proportional valve not shown.

Inertial measurement units (IMUs) 13a, 13b, 13c, and 13d are respectively arranged as posture sensors in the upper swing structure 10, in the vicinity of a coupling portion of the boom 11, where the boom 11 is coupled to the upper swing structure 10, in the vicinity of a coupling portion of the arm 12, where the arm 12 is coupled to the boom 11, and in the vicinity of a coupling portion of the bucket 8, where the bucket 8 is coupled to the arm 12. In the following, when these inertial measurement units need to be distinguished from each other, the inertial measurement units will be respectively referred to as a boom inertial measurement unit 13a, an arm inertial measurement unit 13b, a bucket inertial measurement unit 13c, and a machine body inertial measurement unit 13d.

The inertial measurement units 13a, 13b, 13c, and 13d measure angular velocity and acceleration. When consideration is given to a case where the upper swing structure 10 and each of the driven members 8, 11, and 12 for which the inertial measurement units 13a, 13b, 13c, and 13d are arranged are stationary, the orientation (angle to the ground: angle with respect to a horizontal direction) of each of the driven members 8, 11, and 12 and an angle to the ground in a forward-rearward direction (pitch angle) and an angle to the ground in a left-right direction (roll angle) of the upper swing structure 10 can be sensed as information about a posture on the basis of a direction of gravitational acceleration (that is, a vertically downward direction) in an IMU coordinate system set to each of the inertial measurement units 13a, 13b, 13c, and 13d and an attachment state of each of the inertial measurement units 13a, 13b, 13c, and 13d (that is, relative positional relation between each of the inertial measurement units 13a, 13b, 13c, and 13d and the upper swing structure 10 and each of the driven members 8, 11, and 12). Here, the inertial measurement units 13a, 13b, 13c, and 13d constitute a posture information sensor that senses information about the posture of each of the plurality of driven members 8, 11, and 12 and the upper swing structure 10 (which will hereinafter be referred to as posture information).

It is to be noted that while description has been made by illustrating the inertial measurement units 13a, 13b, 13c, and 13d as the posture information sensor in the present embodiment, there is no limitation to this. For example, inclination angle sensors may be used in place of the inertial measurement units 13a, 13b, 13c, and 13d. In addition, potentiometers may be arranged on coupling parts of the respective driven members 8, 11, and 12 in place of the inertial measurement units 13a, 13b, and 13c to sense relative orientations (posture information) of the upper swing structure 10 and each of the driven members 8, 11, and 12, and the posture (angle with respect to a horizontal plane) of each of the driven members 8, 11, and 12 may be determined from a result of the sensing. In addition, a configuration may be adopted such that a stroke sensor is disposed in each of the boom cylinder 5, the arm cylinder 6, and the bucket cylinder 7, the relative orientations (posture information) of the upper swing structure 10 and the respective connecting parts of the driven members 8, 11, and 12 are calculated from stroke change amounts, and the posture (angle with respect to the horizontal plane) of each of the driven members 8, 11, and 12 is determined from a result of the calculation.

The hydraulic excavator M1 has a GNSS (Global Navigation Satellite System). Receiving antennas (GNSS antennas) 18a and 18b for GNSS are arranged on the upper portion of the upper swing structure 10. The GNSS is a satellite positioning system (positioning device) that can receive positioning signals from a plurality of positioning satellites, and determine an own position on earth. The GNSS antennas 18a and 18b receive the positioning signals from the plurality of positioning satellites located above the earth. The positions in a terrestrial coordinate system of the GNSS antennas 18a and 18b can be obtained by performing computation in a GNSS receiver not shown on the basis of the obtained positioning signals. The mounting positions of the GNSS antennas 18a and 18b with respect to the hydraulic excavator M1 are know in advance. Thus, the position and orientation (azimuth angle) of the hydraulic excavator M1 with respect to a reference point on a construction site can be obtained as position information by obtaining the positions in the terrestrial coordinate system of the GNSS antennas 18a and 18b.

The controller 100 controls the operation of the whole of the hydraulic excavator M1. The controller 100 outputs a machine control signal to the control valve 20, outputs a state notification signal to the state notifying device 41, and outputs an alarm signal to the alarm device 43, on the basis of the operation signals from the operation devices 1a, 1b, 1c, and 1d, the position information from the GNSS antennas 18a and 18b (GNSS receivers), the posture information from the inertial measurement units 13a, 13b, 13c, and 13d, an operation switching signal from the operation selector switch 40, the communication signal from the communicating device 44, and a surrounding detection signal from the detecting sensors 42a, 42b, and 42c.

Here, at least one of the state notifying device 41, the detecting sensors 42a, 42b, and 42c, the alarm device 43, and the communicating device 44 constitutes a cooperative function device that shares information about the hydraulic excavator M1 as a work machine with the inside and outside of the work machine.

Figure 2:
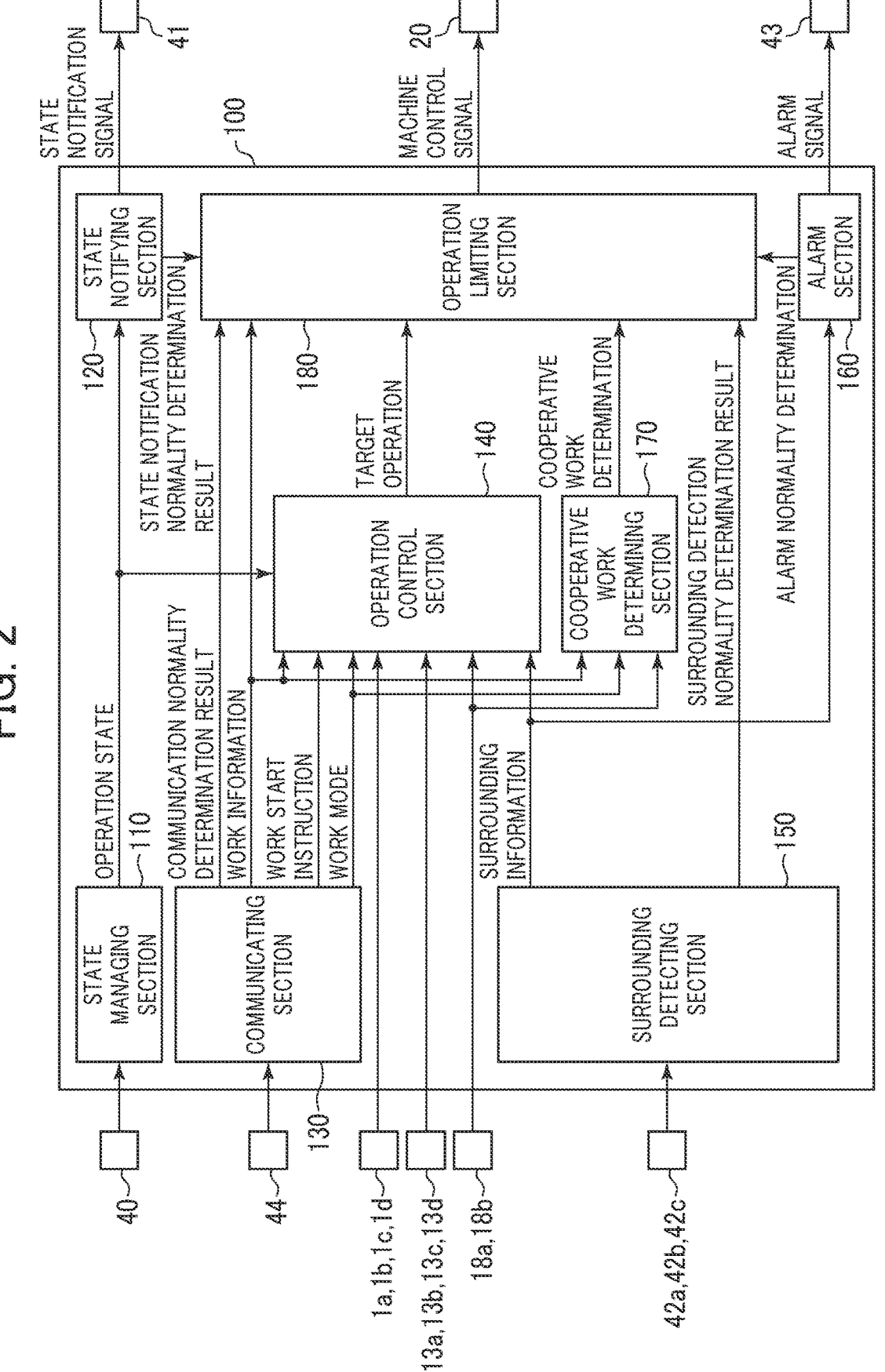
FIG. 2 is a functional block diagram extracting and showing a part of processing functions of a controller according to a first embodiment together with related configurations.

FIG. 2 is a functional block diagram extracting and showing a part of processing functions of the controller included in the hydraulic excavator together with related configurations.

In FIG. 2, the controller 100 includes a state managing section 110, a state notifying section 120, a communicating section 130, an operation control section 140, a surrounding detecting section 150, an alarm section 160, a cooperative work determining section 170, and an operation limiting section 180.

The state managing section 110 selectively switches the operation state of the hydraulic excavator M1 between the manual operation and the automatic operation according to the operation switching signal from the operation selector switch 40. That is, the state managing section 110 determines which of states of the manual operation and the automatic operation the operation state selected by the operation selector switch 40 is, and outputs the determined operation state to the state notifying section 120 and the operation control section 140.

The state notifying section 120 outputs a state notification signal to the state notifying device 41 according to the operation state from the state managing section 110. The state notifying device 41 notifies the surroundings about the operation state of the hydraulic excavator M1 by, for example, lighting a color corresponding to the state notification signal.

In addition, the state notifying section 120 has a function of detecting an abnormality in the state notifying device 41 (abnormality in a state notifying function). The state notifying section 120, for example, determines whether or not there is an abnormality in operation of the state notifying device 41 or whether or not there is a break in wiring between the state notifying section 120 and the state notifying device 41, and outputs a result of the determination to the operation limiting section 180. Various methods for determining the abnormality are conceivable. However, the determination can be made on the basis of, for example, whether or not the voltage value or current value of a signal line that connects the state notifying section 120 and the state notifying device 41 to each other is outside a predetermined range or whether or not a check signal from the state notifying device 41 (for example, an Arrival signal in CAN communication) is normal. Incidentally, in the present embodiment, suppose that the determination result (state notification normality determination) is output to the operation limiting section 180 when it is determined that the state notifying device 41 is normal, and that no signal is output to the operation limiting section 180 when it is determined that the state notifying device 41 is abnormal.

The communicating section 130 extracts information such as work information, a work start instruction, and a work mode from the communication signal received by the communicating device 44, and outputs the information to various parts of the controller 100. Specifically, the communicating section 130 outputs the work information to the operation control section 140, the cooperative work determining section 170, and the operation limiting section 180, outputs the work start instruction to the operation control section 140, and outputs the work mode to the operation control section 140 and the cooperative work determining section 170.

In addition, the communicating section 130 has a function of detecting an abnormality such as a communication interruption by the communicating device 44 (abnormality in a communicating function). The communicating section 130, for example, determines whether or not there is an abnormality in operation of the communicating device 44 or whether or not there is a break in wiring between the communicating section 130 and the communicating device 44, and outputs a result of the determination to the operation limiting section 180. A method similar to that of the state notifying section 120, for example, can be used for the abnormality determination. Incidentally, in the present embodiment, suppose that the determination result (communication normality determination) is output to the operation limiting section 180 when it is determined that the communicating device 44 is normal, and that no signal is output to the operation limiting section 180 when it is determined that the communicating device 44 is abnormal.

Figure 4:
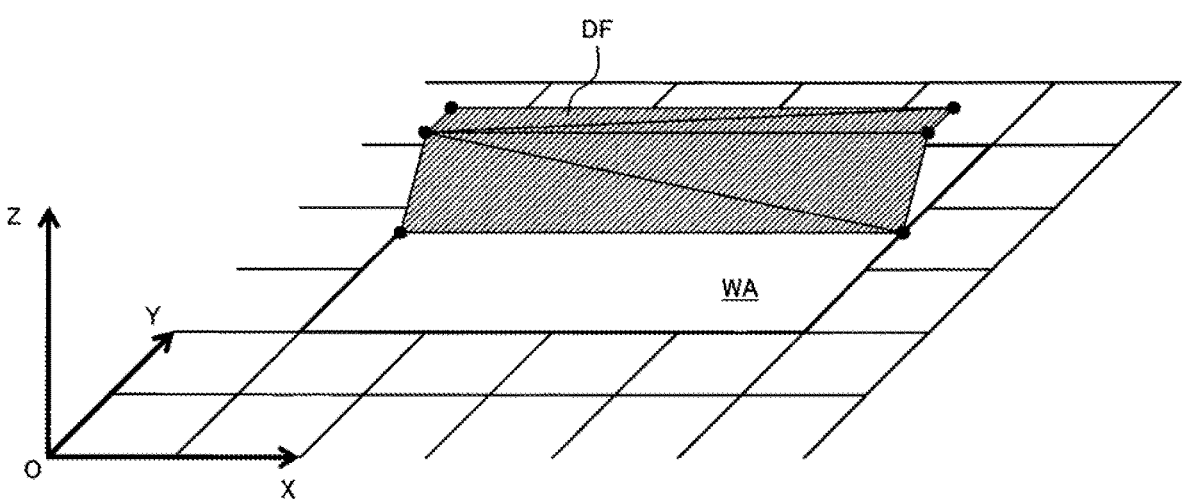
FIG. 4 is a diagram showing an example of a three-dimensional shape obtained from the work information.

FIG. 3 is a diagram showing numerical data as an example of the work information extracted by the communicating section. In addition, FIG. 4 is a diagram showing an example of a three-dimensional shape obtained from the work information.

As shown in FIG. 3, numerical data of the work information represents each of a work area and a plurality of surfaces constituting a design surface by the coordinates of three points in a coordinate system set on a work site. The three-dimensional shape as shown in FIG. 4 can be obtained by representing the work information of FIG. 3 three-dimensionally. The work information includes a work area WA and a design surface DF. The work area WA is two-dimensional area information on which the hydraulic excavator M1 is allowed to operate. In addition, the design surface DF is three-dimensional surface information indicating a target shape of a construction object.

The information of the work mode extracted by the communicating section 130 is used as an instruction for generating an operation pattern corresponding to work contents in the operation control section 140 at a time of the automatic operation of the hydraulic excavator M1. The work mode includes a shaping mode for excavating a shape corresponding to the design surface, a loading mode for loading an excavated soil onto a dump truck, and the like.

The surrounding detecting section 150 computes information such as the presence or absence of an object on the periphery of the hydraulic excavator M1 and the position of the object when the object is present as surrounding information on the basis of detection results from the detecting sensors 42a, 42b, and 42c. The surrounding detecting section 150 outputs the surrounding information to the operation control section 140 and the alarm section 160.

In addition, the surrounding detecting section 150 has a function of detecting an abnormality in the detecting sensors 42a, 42b, and 42c (abnormality in a detecting function). The surrounding detecting section 150, for example, determines whether or not there is an abnormality in operation of the detecting sensors 42a, 42b, and 42c or whether or not there is a break in wiring between the surrounding detecting section 150 and the detecting sensors 42a, 42b, and 42c, and outputs a result of the determination to the operation limiting section 180. A method similar to that of the state notifying section 120, for example, can be used for the abnormality determination. Incidentally, in the present embodiment, suppose that the determination result (surrounding detection normality determination) is output to the operation limiting section 180 when it is determined that the detecting sensors 42a, 42b, and 42c are normal, and that no signal is output to the operation limiting section 180 when it is determined that the detecting sensors 42a, 42b, and 42c are abnormal.

The operation control section 140 computes a target operation according to the operation state from the state managing section 110, and outputs the target operation as an operation control signal to the control valve 20 via the operation limiting section 180. The operation control section 140 generates and outputs the target operation of the hydraulic excavator M1 according to the operation signals from the operation devices 1a, 1b, 1c, and 1d when the operation state is the manual operation. In addition, the operation control section 140 generates and outputs the target operation of the hydraulic excavator M1 according to the work information, the work mode, and the work start instruction from the communicating section 130 when the operation state is the automatic operation.

In addition, the operation control section 140 corrects the target operation (operation control signal) to be output according to the position information from the GNSS antennas 18a and 18b (GNSS receivers), the posture information from the inertial measurement units 13a to 13d, and the surrounding information from the surrounding detecting section 150. For example, at a time of the automatic operation, publicly known feedback control may be performed so as to reduce an error between a target trajectory of the bucket, which is computed on the basis of the design surface, and an actual trajectory of the bucket, which is computed from the position and posture information, or the target trajectory of the bucket may be corrected so as to avoid the position of a detected object included in the surrounding information. In addition, also at a time of the manual operation, the operation speed of the hydraulic excavator M1 may be decreased as the position of the detected object becomes close to the hydraulic excavator M1.

The alarm section 160 outputs an alarm signal to the alarm device 43 according to the surrounding information from the surrounding detecting section 150. Specifically, when an object is detected in the detection range set on the periphery of the hydraulic excavator M1, an alarm signal for issuing alarm notification to the inside and outside of the hydraulic excavator M1 is output to the alarm device 43.

In addition, the alarm section 160 has a function of detecting an abnormality in the alarm device 43 (abnormality in an alarm function). The alarm section 160, for example, determines whether or not there is an abnormality in operation of the alarm device 43 or whether or not there is a break in wiring between the alarm section 160 and the alarm device 43, and outputs a result of the determination to the operation limiting section 180. A method similar to that of the state notifying section 120, for example, can be used for the abnormality determination. Incidentally, in the present embodiment, suppose that the determination result (alarm normality determination) is output to the operation limiting section 180 when it is determined that the alarm device 43 is normal, and that no signal is output to the operation limiting section 180 when it is determined that the alarm device 43 is abnormal.

The cooperative work determining section 170 determines whether or not the hydraulic excavator M1 is performing cooperative work on the basis of the work information and the work mode from the communicating section 130 and the position information from the GNSS receivers 18, and outputs a result of the determination (cooperative work determination) to the operation limiting section 180. In the present embodiment, certain work performed by another work machine or a worker on the periphery of the hydraulic excavator M1 for cooperation with the hydraulic excavator M1 will be defined as cooperative work.

The operation limiting section 180 limits the operation control signal (target operation) sent from the operation control section 140 to the control valve 20 on the basis of the state notification normality determination from the state notifying section 120, the communication normality determination and the work information from the communicating section 130, the cooperative work determination from the cooperative work determining section 170, the surrounding detection normality determination from the surrounding detecting section 150, and the alarm normality determination from the alarm section 160. The operation control signal limited by the operation limiting section 180 will be referred to as a machine control signal.

Figure 5:
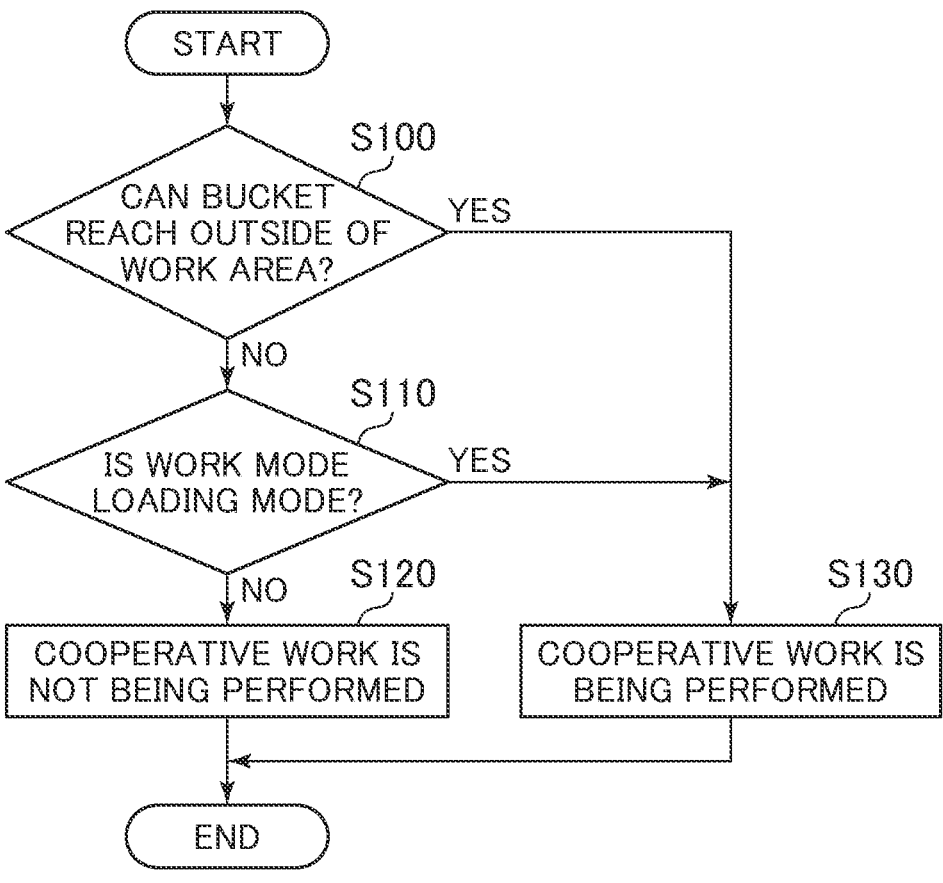
FIG. 5 is a flowchart showing processing contents of cooperative work determination processing in a cooperative work determining section.

FIG. 5 is a flowchart showing processing contents of cooperative work determination processing in the cooperative work determining section.

In FIG. 5, the cooperative work determining section 170 first determines whether or not the bucket 8 can reach the outside of the work area WA set in advance (step S100). When a result of the determination is YES, the cooperative work determining section 170 determines that the cooperative work is being performed (step S130). The cooperative work determining section 170 then ends the processing.

Figure 6:
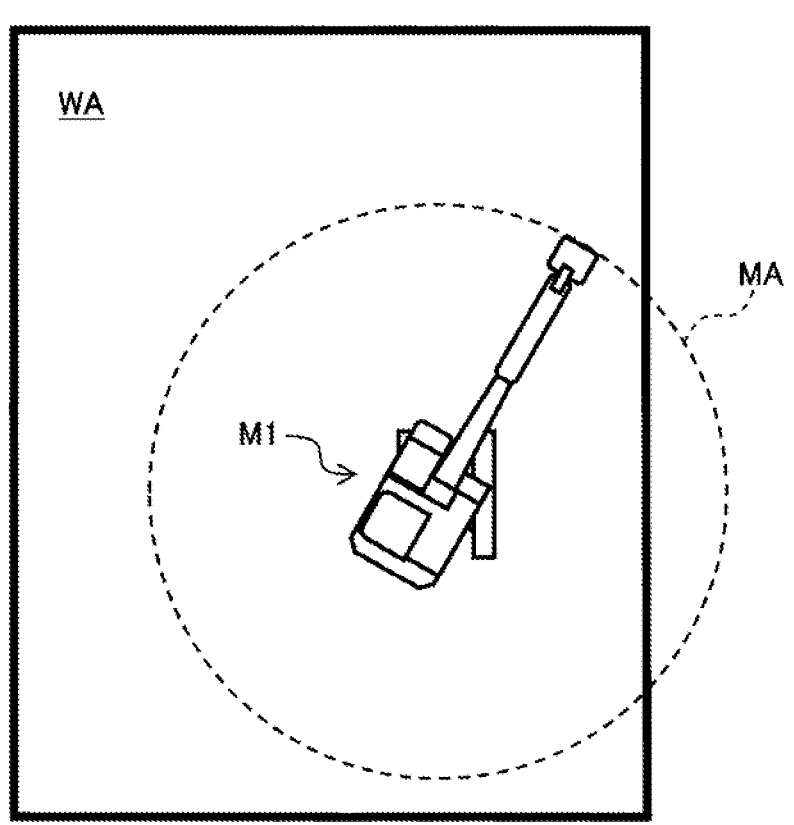
FIG. 6 is a diagram showing an example of relation between a work area and a movable range of the hydraulic excavator.

FIG. 6 is a diagram showing an example of relation between the work area and a movable range of the hydraulic excavator.

As shown in FIG. 6, whether or not the bucket 8 can reach the outside of the work area WA set in advance can be determined by comparing the work area WA and a movable range MA of the hydraulic excavator M1 with each other. For example, in a case shown in FIG. 6, the movable range MA extends to the outside of the work area WA, and it can therefore be determined that the bucket 8 can reach the outside of the work area WA set in advance. In this case, there is a possibility of another work machine or a worker performing work immediately outside the work area WA, and it is therefore determined that the cooperative work is being performed.

Returning to FIG. 5, when the determination result in step S100 is NO, that is, when the cooperative work determining section 170 determines that the bucket 8 cannot reach the outside of the work area WA set in advance, the cooperative work determining section 170 determines whether or not the work mode is the loading mode (step S110). When a result of the determination is YES, the cooperative work determining section 170 determines that the cooperative work is being performed (step S130). The cooperative work determining section 170 then ends the processing. During loading work, there is a strong possibility of loading an excavation object onto another machine such as a dump truck, and therefore it is determined that the cooperative work is being performed. Incidentally, even when other than the loading mode is set, it may be determined that the cooperative work is being performed in a case of work in which there is a strong possibility of another machine being present on the periphery of the hydraulic excavator M1.

In addition, when the determination result in step S110 is NO, that is, when the work mode is another work mode than the loading mode, the cooperative work determining section 170 determines that the cooperative work is not being performed (step S120). The cooperative work determining section 170 then ends the processing.

Figure 7:
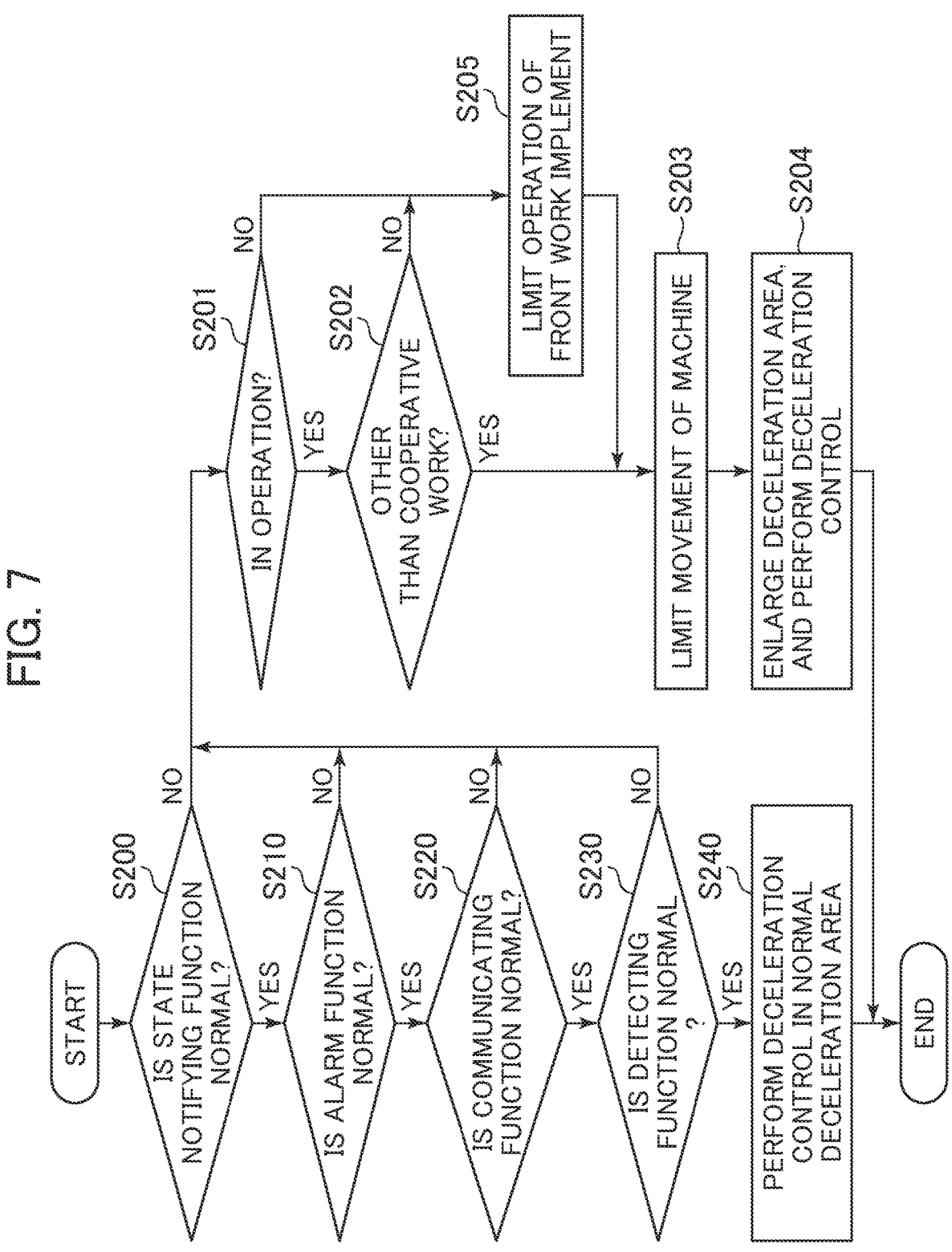
FIG. 7 is a flowchart showing processing contents of operation limitation processing in an operation limiting section.

FIG. 7 is a flowchart showing processing contents of operation limitation processing in the operation limiting section.

In FIG. 7, the operation limiting section 180 first determines whether or not the state notifying function is normal (step S200), whether or not the alarm function is normal (step S210), whether or not the communicating function is normal (step S220), and whether or not the detecting function is normal (step S230). When determination results in steps S200 to S230 are all YES, the operation limiting section 180 performs deceleration control in a normal deceleration area (step S240). The operation limiting section 180 then ends the processing.

Figure 8:
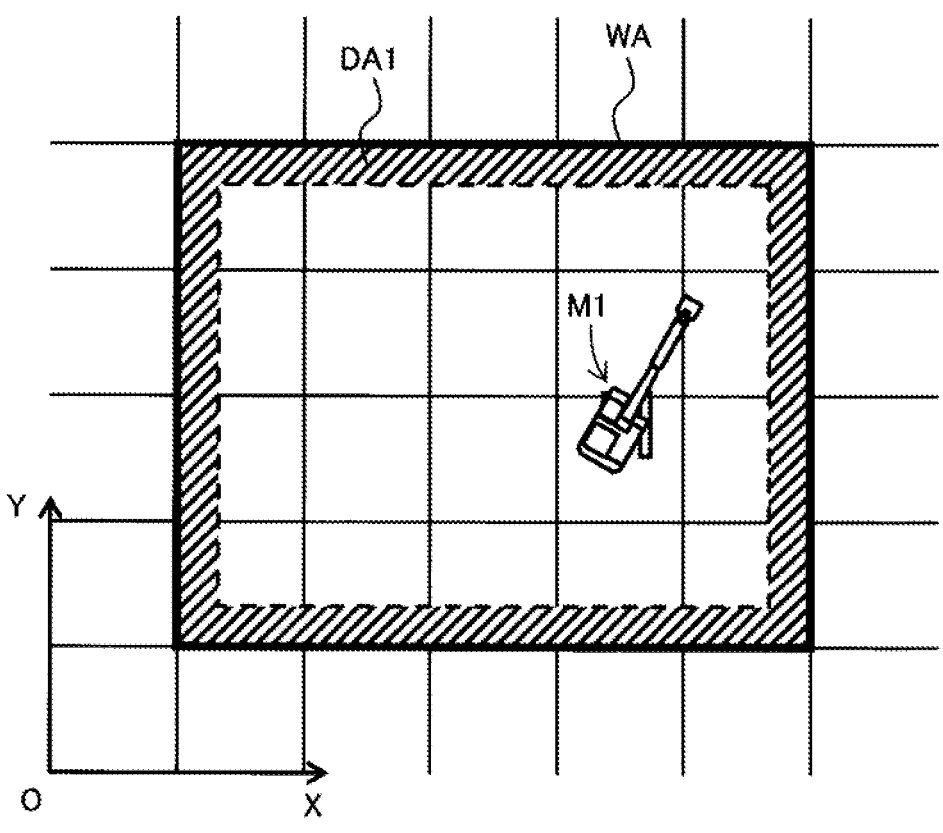
FIG. 8 is a diagram showing an example of relation between the work area and a normal deceleration area.

FIG. 8 is a diagram showing an example of relation between the work area and the normal deceleration area.

In FIG. 8, a deceleration area DA1 is provided on the inside of the work area WA along the perimeter of the work area WA. The deceleration control is control that, when at least a part (for example, the bucket 8) of the hydraulic excavator M1 moves in the deceleration area DA1, prevents the hydraulic excavator M1 from deviating from the work area by decreasing operation speed as the part of the hydraulic excavator M1 approaches the boundary line of the work area WA. The limitation of the operation speed is performed by limiting the operation control signal by the operation limiting section 180.

Returning to FIG. 7, when the determination result in any of steps S200 to S230 is NO, that is, when the operation limiting section 180 determines that there is an abnormality in at least one of the state notifying function, the alarm function, the communicating function, and the detecting function, the operation limiting section 180 determines whether or not the hydraulic excavator M1 is in operation (step S201) and whether or not the cooperative work is being performed (step S202). In the determination in step S201, the operation limiting section 180 determines that the hydraulic excavator M1 is in operation when the machine control signal preceding by one cycle in control cycles is a predetermined value or more, for example.

When determination results in both of steps S201 and S202 are YES, that is, when the hydraulic excavator M1 is in operation and the cooperative work is not being performed, the operation limiting section 180 limits the operation control signal so as to limit (stop or decelerate) the movement of the hydraulic excavator M1 (step S203), and further performs the deceleration control in an enlarged deceleration area (step S204). The operation limiting section 180 then ends the processing.

Figure 9:
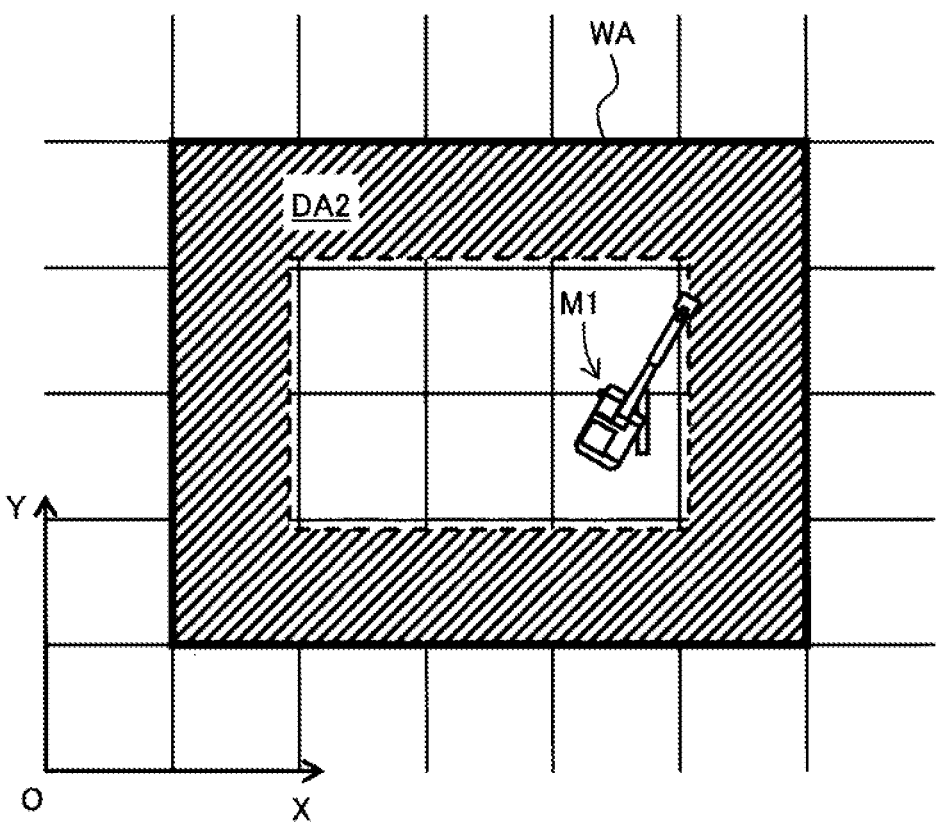
FIG. 9 is a diagram showing an example of relation between the work area and an enlarged deceleration area.

FIG. 9 is a diagram showing an example of relation between the work area and the enlarged deceleration area.

In FIG. 9, an enlarged deceleration area DA2 is provided so as to be enlarged to the inside of the work area WA as compared with the normal deceleration area DA1. In deceleration processing using the deceleration area DA2, as compared with deceleration processing using the deceleration area DA1, the speed of the hydraulic excavator M1 is decreased at a position more distant from the perimeter of the work area WA, and therefore the hydraulic excavator M1 can be more reliably prevented from deviating from the work area. In addition, it can be said that in the deceleration processing using the deceleration area DA2, the operation speed of the hydraulic excavator is slowed (becomes moderate) on average.

Returning to FIG. 7, when the determination result in at least one of steps S201 and S202 is NO, that is, when the hydraulic excavator M1 is not in operation or the cooperative work is being performed, the operation limiting section 180 limits the operation control signal so as to limit (stop or decelerate) the operation of the front work implement 15

(step S205). The operation limiting section 180 then ends the processing after the processing of steps S203 and S204.

Thus, in the present embodiment, by limiting the operation control signal, it is possible to stop the operation of a specific actuator, such as operating the front work implement 15 but not performing (stopping) travelling operation, in addition to stopping or decelerating (that is, numerically decreasing) the speed of the movement of the hydraulic excavator M1 and each operation of the front work implement 15.

Effects of the present embodiment configured as described above will be described.

In the conventional technology, when a fault occurs in communication between an operation device and the work machine, a transportation vehicle is stopped or decelerated by transmitting a stop instruction signal or a deceleration signal as a travelling suppressing instruction signal, and thereby contact between the work machine and the transportation vehicle is prevented. However, when functions for performing work are normal in a case where the operator aboard the work machine performs an operation or in a case where autonomous work is performed, the fault in the communication may not become a problem in carrying out the work. That is, in such a case, the stopping or decelerating of the work machine in response to the fault in the communication is excessive control, and invites an unnecessary decrease in work efficiency.

On the other hand, in the present embodiment, the hydraulic excavator M1 for performing the cooperative work with another work machine or a worker includes: the boom cylinder 5, the arm cylinder 6, the bucket cylinder 7, the swing hydraulic motor 4, and the left and right travelling hydraulic motors 3 as the hydraulic actuators (driving devices) that make the hydraulic excavator operate; the cooperative function device (the state notifying device 41, the detecting sensors 42a, 42b, and 42c, the alarm device 43, and the communicating device 44) that shares information about the hydraulic excavator M1 with the inside and outside of the hydraulic excavator M1; and the controller 100 that computes the operation control signal to control the operation of the hydraulic excavator M1, and outputs the operation control signal to the driving devices. The controller 100 is configured to limit the operation control signal output to the driving devices so as to limit the operation of the hydraulic excavator M1 when there is an abnormality in the cooperative function device, and when the hydraulic excavator M1 is performing the cooperative work, limit the operation control signal so as to make a degree of limitation on the operation of the hydraulic excavator M1 stronger than when the hydraulic excavator M1 is not performing the cooperative work. It is therefore possible to suppress an unnecessary decrease in work efficiency by suppressing an excessive operation limitation on the work machine.

That is, even when one of the state notifying function, the alarm function, the communicating function, and the detecting function is not normal, work using the front work implement 15 can be continued (excessive operation limitation is not performed) in a case where the hydraulic excavator M1 is in operation but is not performing the cooperative work. It is therefore possible to suppress an unnecessary decrease in work efficiency.

In addition, when the operation is stopped or the cooperative work is being performed, that is, when there is a possibility of another work machine or a worker being present on the periphery of the hydraulic excavator M1, the operation of the front work implement 15 can be limited.

Second Embodiment

A second embodiment of the present invention will be described with reference to FIG. 10 and FIG. 11.

The present embodiment represents a case where a control system is configured by providing, on the outside of the hydraulic excavator M1 (for example, a management server within a management office), at least one function of the surrounding detecting section 150 (including the detecting sensors 42a, 42b, and 42c), the alarm section 160 (including the alarm device 43), and the cooperative work determining section 170 among the functional sections of the controller 100 in the first embodiment.

Figure 10:
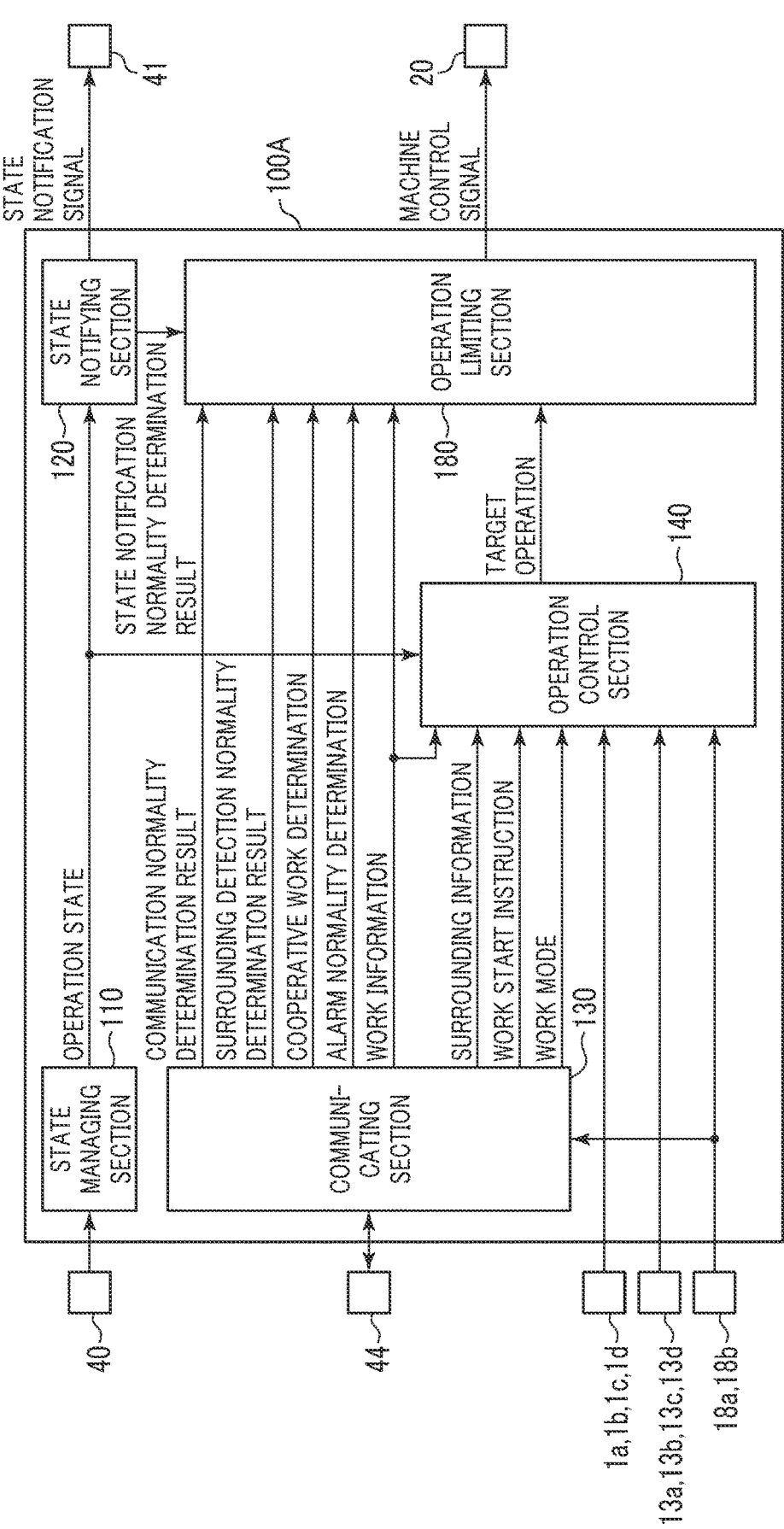
FIG. 10 is a functional block diagram extracting and showing a part of processing functions of a controller according to a second embodiment together with related configurations.
Figure 11:
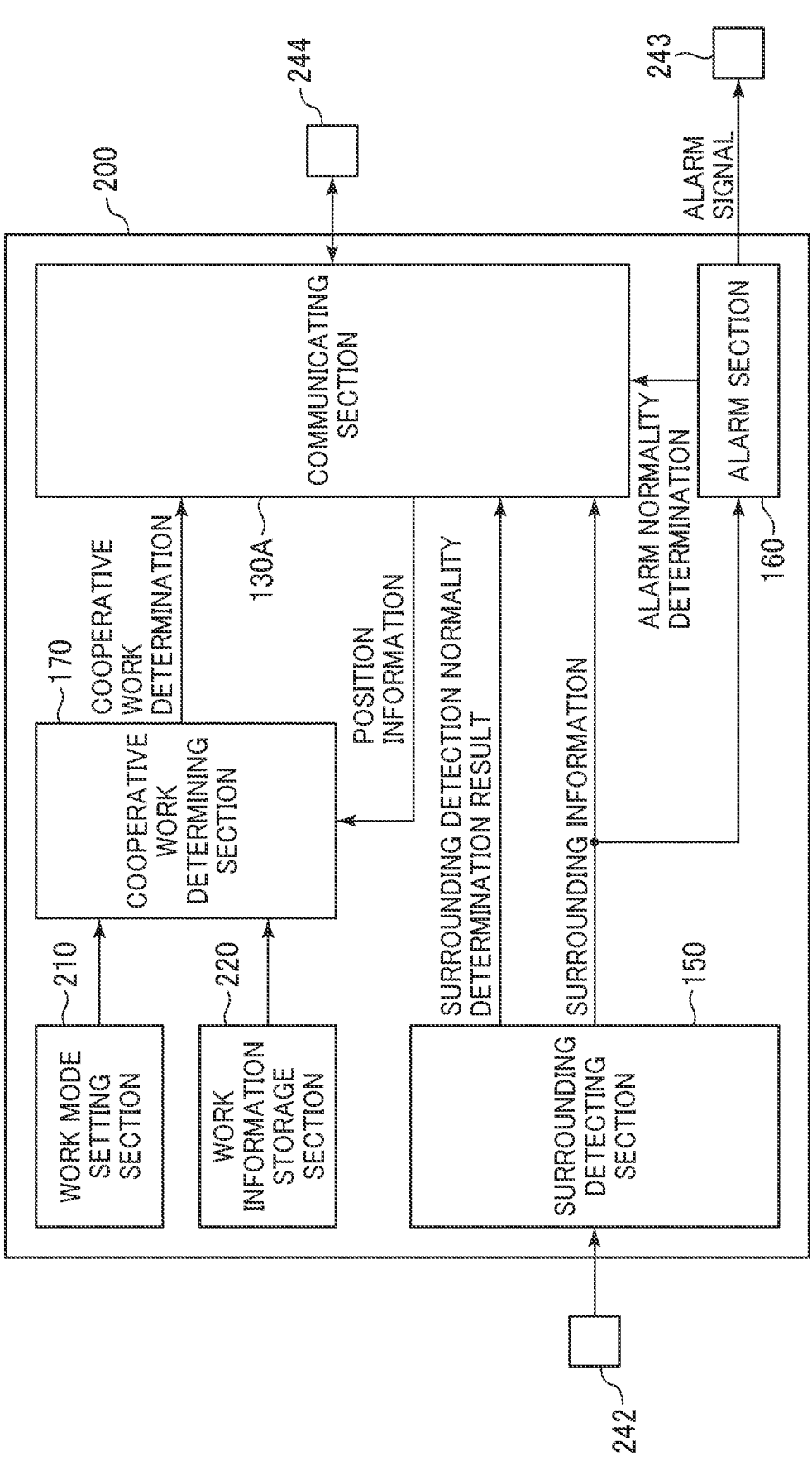
FIG. 11 is a diagram extracting and showing a part of processing functions of a management server according to the second embodiment together with related configurations.

FIG. 10 and FIG. 11 are diagrams showing processing functions of the control system according to the present embodiment. FIG. 10 is a functional block diagram extracting and showing a part of processing functions of a controller included in a hydraulic excavator together with related configurations. FIG. 11 is a diagram extracting and showing a part of processing functions of a management server together with related configurations. In the figures, similar members to those of the first embodiment are identified by the same reference numerals, and description thereof will be omitted.

In FIG. 10, a controller 100A includes a state managing section 110, a state notifying section 120, a communicating section 130, an operation control section 140, and an operation limiting section 180.

The operation control section 140 corrects the target operation (operation control signal) to be output according to the position information from the GNSS antennas 18a and 18b (GNSS receivers), the posture information from the inertial measurement units 13a to 13d, and the surrounding information sent from a management server 200 via the communicating device 44 and the communicating section 130.

The operation limiting section 180 limits the operation control signal (target operation) sent from the operation control section 140 to the control valve 20 on the basis of the state notification normality determination from the state notifying section 120, the communication normality determination and the work information from the communicating section 130, and the cooperative work determination, the surrounding detection normality determination, and the alarm normality determination sent from the management server 200 via the communicating device 44 and the communicating section 130.

In addition, in FIG. 11, the management server 200 includes a communicating section 130A, a surrounding detecting section 150, an alarm section 160, and a cooperative work determining section 170 as well as a work mode setting section 210 and a work information storage section 220.

The communicating section 130A extracts the position information obtained by the GNSS antennas 18a and 18b (GNSS receivers) provided to the hydraulic excavator M1 from a communication signal received by a communicating device 244, and outputs the position information to the cooperative work determining section, and the communicating section 130A outputs, to the hydraulic excavator M1 via the communicating device 244, the surrounding information and the surrounding detection normality determination obtained by the surrounding detecting section 150 of the management server 200, the alarm normality determination obtained by the alarm section 160, and the cooperative work determination obtained by the cooperative work determining section 170.

The surrounding detecting section 150 computes information such as the presence or absence of an object on the periphery of the hydraulic excavator M1 and the position of the object when the object is present as the surrounding information on the basis of a detection result(s) from one or more detecting sensors 242 provided on the outside of the hydraulic excavator M1 (for example, at a position on the periphery of the hydraulic excavator M1 with a work range as a detection range). The surrounding detecting section 150 outputs the surrounding information to the communicating section 130A and the alarm section 160. In addition, the surrounding detecting section 150 outputs a result of the surrounding detection normality determination to the communicating section 130A.

The alarm section 160 outputs an alarm signal to the alarm device 243 according to the surrounding information from the surrounding detecting section 150. In addition, the alarm section 160 outputs a result of the alarm normality determination to the communicating section 130A.

The cooperative work determining section 170 determines whether or not the hydraulic excavator M1 is performing cooperative work on the basis of the work mode set by the work mode setting section 210, the work information stored in the work information storage section 220, and the position information of the hydraulic excavator M1, which is obtained via the communicating section 130A. The cooperative work determining section 170 outputs a result of the determination (cooperative work determination) to the communicating section 130A.

The alarm device 242 is installed on the periphery of the hydraulic excavator M1 or a management office in which the management server 200 is installed or the like. The alarm device 242 issues an alarm to the periphery of the hydraulic excavator M1 and a manager of the management office according to a detection result(s) of the detecting sensor(s) 242 under control of the controller 100A and the management server 200.

Other configurations are similar to those of the first embodiment.

The present embodiment configured as described above can also provide effects similar to those of the first embodiment.

<Supplementary Notes>

It is to be noted that the present invention is not limited to the foregoing embodiments, and includes various modifications and combinations within a scope not departing from the spirit of the present invention. In addition, the present invention is not limited to those including all of the configurations described in the foregoing embodiments, but also includes those from which a part of the configurations are omitted. In addition, a part or the whole of each of the configurations, the functions, and the like described above may be implemented by, for example, being designed in an integrated circuit or the like. In addition, each of the configurations, the functions, and the like described above may be implemented by software such that a processor interprets and executes a program that implements each function.

DESCRIPTION OF REFERENCE CHARACTERS

1a, 1b, 1c, 1d: Operation device
2: Hydraulic pump device
3: Travelling hydraulic motor
4: Swing hydraulic motor

5: Boom cylinder
6: Arm cylinder
7: Bucket cylinder
8: Bucket
9: Lower track structure
10: Upper swing structure
11: Boom
12: Arm
13a, 13b, 13c, 13d: Inertial measurement unit (IMU)
14: Engine
15: Front work implement
16: Cab
18a, 18b: GNSS antenna
20: Control valve
40: Operation selector switch
41: State notifying device
42a, 42b, 42c, 242: Detecting sensor
43, 243: Alarm device
44, 244: Communicating device
100, 100A: Controller
110: State managing section
120: State notifying section
130, 130A: Communicating section
140: Operation control section
150: Surrounding detecting section
160: Alarm section
170: Cooperative work determining section
180: Operation limiting section
200: Management server
210: Work mode setting section
220: Work information storage section
DA1, DA2: Deceleration area
DF: Design surface
M1: Hydraulic excavator
MA: Movable range
WA: Work area

The invention claimed is:

1. A work machine for performing cooperative work with another work machine or a worker, the work machine comprising:

a driving device that makes a work implement and a track structure of the work machine operate;

a cooperative function device that shares information about the work machine with an inside and an outside of the work machine; and a controller that controls the driving device so that when a bucket provided with the work implement moves in a deceleration area provided inside a work area along a periphery of the work area represented by a coordinate in a coordinate system on a work site where the work machine performs work, as a range that the work machine is allowed to operate, an operating speed of the work machine decreases as the bucket approaches a boundary line of the work area, so that the work machine does not deviate from the work area, the controller being configured to:

when the bucket can reach outside the work area, determine that the work machine is performing collaborative work, and when there is an abnormality in the cooperative function device and the work machine is not performing the cooperative work, enlarge the deceleration area toward the inside of the work area from the perimeter of the work area compared to when there is no abnormality in the cooperative function device and control the driving device so as to limit operation of the track structure of the work machine, and when there is an abnormality in the cooperative function device and the work machine is performing the cooperative work, enlarge the deceleration area toward the inside of the work area from the perimeter of the work area compared to when there is no abnormality in the cooperative function device and control the driving device so as to limit operation of the work implement and the track structure.

2. The work machine according to claim 1, wherein the cooperative function device includes at least one of a communicating device that transmits and receives information to and from the outside of the work machine, a surrounding detecting device that detects an object on a periphery of the work machine, a state notifying device that notifies the outside of the work machine about an operation state of the work machine, and an alarm device that issues alarm notification to the outside of the work machine on a basis of a detection result of the surrounding detecting device.

3. The work machine according to claim 1, wherein the controller is configured to, when there is an abnormality in the cooperative function device and the work machine is not in operation, control the driving device so as to limit operation of the work implement in addition to the track structure.

4. A control system for controlling operation of a work machine for performing cooperative work with another work machine or a worker, the control system comprising:
a work machine including a driving device that makes a work implement and a track structure of the work machine operate and a controller that controls the driving device so that when a bucket provided with the work implement moves in a deceleration area provided inside a work area along a periphery of the work area represented by a coordinate in a coordinate system on a work site where the work machine performs work, as a range that the work machine is allowed to operate, an operating speed of the work machine decreases as the bucket approaches a boundary line of the work area, so that the work machine does not deviate from the work area; and
a cooperative function device that shares information about the work machine with an inside and an outside of the work machine,
the controller being configured to:
when the bucket can reach outside the work area determine that the work machine is performing collaborative work, and
when there is an abnormality in the cooperative function device and the work machine is not performing the cooperative work, enlarge the deceleration area toward the inside of the work area from the perimeter of the work area compared to when there is no abnormality in the cooperative function device and control the driving device so as to limit operation of the track structure of the work machine, and when there is an abnormality in the cooperative function device and the work machine is performing the cooperative work area from the perimeter of the work area compared to when there is no abnormality in the cooperative function device and, control the driving device so as to limit operation of the work implement and the track structure.

5. The control system according to claim 4, wherein the cooperative function device includes at least one of a surrounding detecting device that detects an object on a periphery of the work machine, an alarm device that issues alarm notification to the outside of the work machine on a basis of a detection result of the surrounding detecting device, and a determining device that determines whether or not the work machine is performing the cooperative work.

* * * * *